United States Patent [19]

Blanchet

[11] 4,169,544

[45] Oct. 2, 1979

[54] MIXING AND DISTRIBUTING APPARATUS FOR GASOLINE AND OIL

[75] Inventor: André F. Blanchet, Le Perreux, France

[73] Assignee: Satam Industries, La Courneuve, France

[21] Appl. No.: 834,266

[22] Filed: Sep. 19, 1977

[30] Foreign Application Priority Data

Sep. 24, 1976 [FR] France ............................... 76 28748

[51] Int. Cl.² ............................................... G01F 11/06

[52] U.S. Cl. .................................... 222/134; 222/309; 222/335; 222/340

[58] Field of Search ..................... 222/43, 48, 57, 134, 222/145, 133, 309, 335, 340

[56] References Cited

U.S. PATENT DOCUMENTS

| | | | |
|---|---|---|---|
| 1,075,898 | 10/1913 | Champ et al. | 222/335 X |
| 3,085,715 | 4/1963 | Douglas | 222/145 X |
| 3,802,608 | 4/1974 | Gullett | 222/309 |
| 4,055,281 | 10/1977 | Rosen et al. | 222/309 |

*Primary Examiner*—Robert J. Spar
*Assistant Examiner*—Fred A. Silververg
*Attorney, Agent, or Firm*—Darby & Darby

[57] ABSTRACT

A mixing and distributing device for gasoline and oil comprises an oil inlet, a duct for gasoline under pressure and a delivery duct. A first vertical cylinder having a first piston is fed from the top with oil and gasoline through a slide valve. A second vertical cylinder, which is located inside the first cylinder and under the first piston, has a second oil piston sliding therein. When the valve is in a first position, gasoline under pressure is fed to the first cylinder thereby urging the first piston downward against a biasing spring to move the second piston downward through abutments on the interior of the first piston. This causes a metered supply of oil to be fed to the top of the first cylinder so as to mix with the pressurized gasoline. A second position of the valve terminates the supply of oil and gasoline, and allows the mixture to be expelled by the first cylinder piston under the effect of the biasing spring through the valve and the delivery duct.

4 Claims, 4 Drawing Figures

MIXING AND DISTRIBUTING APPARATUS FOR GASOLINE AND OIL

The present invention relates to a mixing and distributing apparatus for gasoline and oil.

Gasoline and oil mixing apparatuses comprise generally a mixing cylinder in which a pre-selected quantity of oil is discharged through the agency of a metering device situated adjacent the cylinder and comprising a cylinder-piston assembly.

Such apparatuses have the disadvantage of requiring an auxiliary system for having the metering device control regulated by the gasoline inlet control, and of occupying considerable space.

The object of the invention is to remedy these disadvantages by providing a mixing and distributing apparatus for gasoline and oil comprising an oil tank, a gasoline inlet under pressure and a delivery duct, occupying a reduced space and needing the operation of one drive member only.

Accordingly, the apparatus comprises:

a first vertical cylinder fed from the top with oil and gasoline through a slide-valve distributing unit in which slides a first piston, called a distribution piston biased upwards by a spring, said cylinder being connected to the delivery duct via the distributing unit, a second vertical cylinder located inside the first cylinder, under the first piston, in which slides a second piston, called an oil piston, the lower portion of said second cylinder being connected with the upper portion of the first cylinder and with the oil tank via said distributing unit, a first position of the distributing apparatus causing the first cylinder to be fed with gasoline under pressure which urges a downward motion of the first piston against the biasing spring, said motion driving in turn by means of appropriate abutment means and in the final portion of its stroke, the downward motion of the second piston and the metered supply of oil of the first cylinder, a second position of the distributing apparatus causing the oil and gasoline supply to be stopped and the mixture to be allowed outside, said mixture being then expelled by the first cylinder piston under the effect of the biasing spring.

According to the invention, said abutment means include shoulders formed inside the first piston, coacting with a peg-shaped part arranged transversely at the upper portion of the second piston. Said shoulders are arranged inside the first piston along two circular helixes, each shoulder of a helix being diametrically in opposition with a shoulder of the other helix and on the same level corresponding to a percentage of oil to be mixed with the gasoline.

According to the invention, the second cylinder is rotatably mounted and its rotation provides the possibility to position the peg-shaped part of the second piston opposite the shoulders corresponding to the selected oil percentage.

The invention will become more apparent from the following description of one non limitative embodiment thereof when taken in conjunction with the accompanying drawings, wherein.

Figure 1:
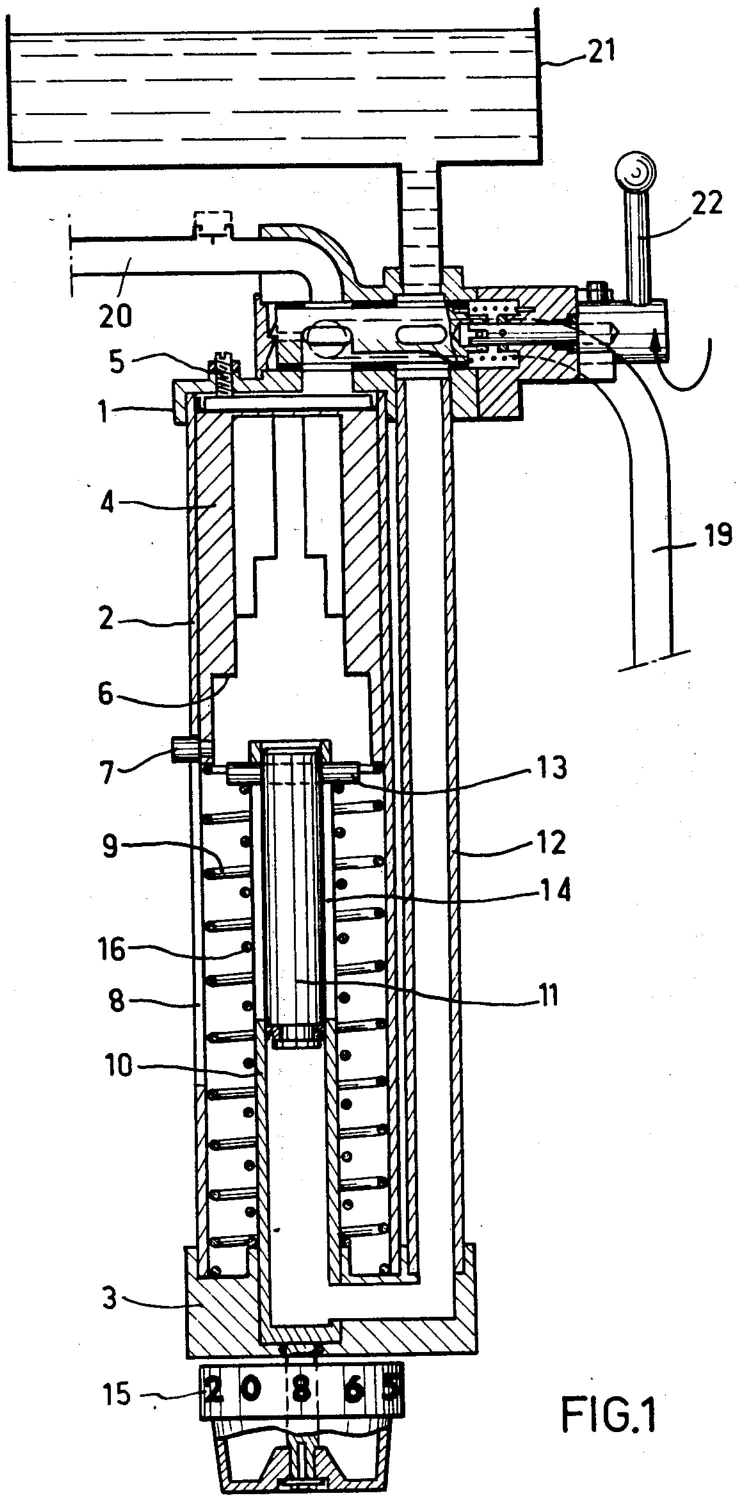
FIG. 1 shows the apparatus according to the invention in its admission condition.
Figure 2:
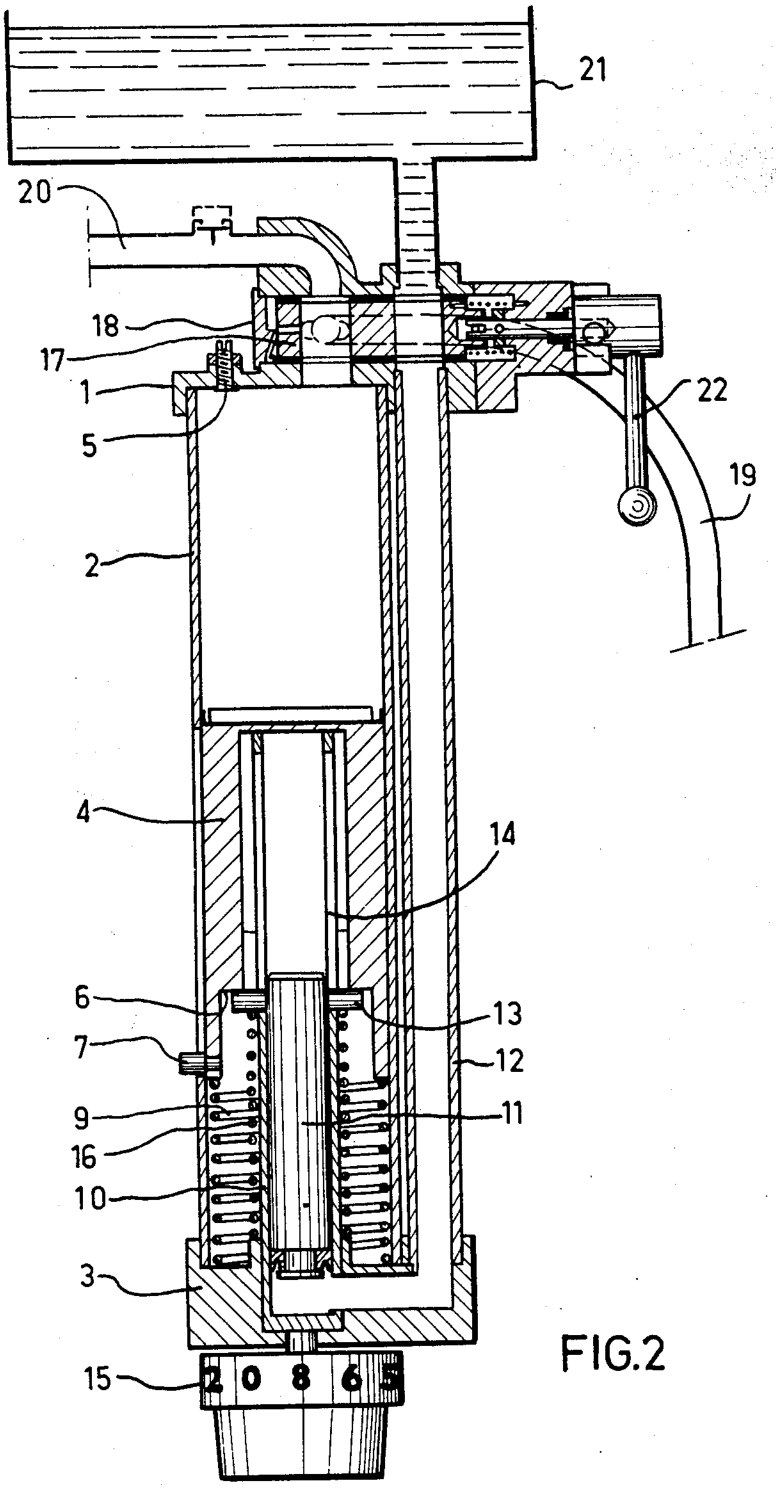
FIG. 2 shows the apparatus according to the invention at the beginning of the delivery phase.
Figure 3:
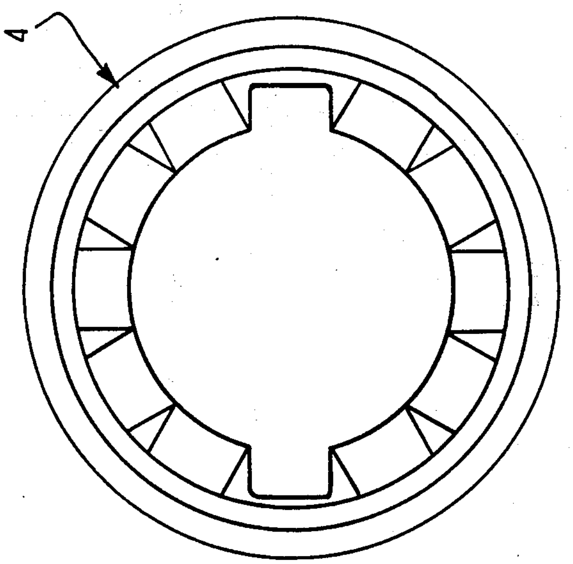
FIG. 3 is a view from underneath of the mixing piston according to the invention.

According to the invention, the apparatus comprises a distribution unit 1 and a lower support 3 between which are a mixing cylinder 2 and an oil cylinder 12, one adjacent the other and vertical.

Inside the mixing cylinder 2 and concentric therewith is a second oil cylinder 10, rotatably mounted and communicating with the former via a channel located in support 3. Said cylinder 10 is provided with an oil piston 11 which is operatively connected in rotation and comprises at its upper end a transverse or peg shaped part 13, sliding in longitudinal port-holes of the oil cylinder 10. Piston 11 is biased upwards by a spring 16 bearing on support 3 and part 13. The rotation of oil cylinder 10 is controlled by knob 15 calibrated in terms of percentages of the mixture (for example 0%, 2, 4, 5, 6, 8%).

Figure 4:
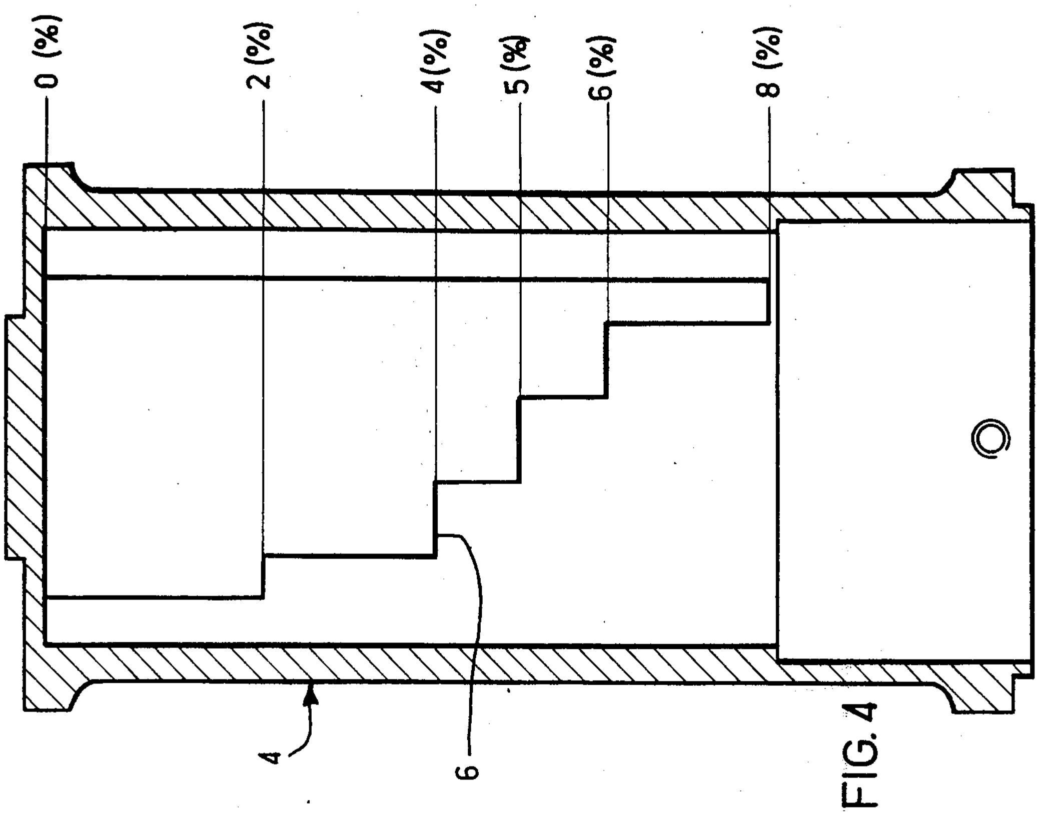
FIG. 4 is a cross-section along line IV—IV of FIG. 3.

Inside the mixing cylinder 2, above the oil cylinder 10 is a mixing or distribution piston 4, fixed in rotation due to a pin 7 sliding within a port-hole 8 formed in the mixing cylinder wall 2. The mixing piston 4 has an outside cylindrical shape. The inner portion comprises two series of shoulders arranged step-wise along two circular helixes on the inner side of the mixing piston wall 4. The series comprise an equal number of shoulders. As is shown in FIG. 4, each of said shoulders corresponds to a percentage of the mixture. The shoulders of either series corresponding to the same percentage are in a diametrically opposite relationship on the piston wall and on the same level.

The distribution unit 1 comprises a rotary slide-valve 17 controlled by a lever 22. The unit is connected with the oil tank 21 and a gasoline inlet 19 on the one hand, and with the mixing cylinder 2, the oil cylinder 12 and a delivery channel 20 on the other hand. The rotary slide-valve is formed with perforations for allowing passage for the oil, the gasoline or the mixture thereof, or for preventing their passage. It may assume two positions established by an abutment member located on a part 18 solid with unit 1.

The operation of the apparatus is as follows:

The operator starts by selecting the oil percentage by turning knob 15 so as to bring the corresponding digit in register with an index. This operation also brings the ends of part 13 in a position opposite the mixing piston shoulders 6 corresponding to the required percentage. Thereafter, and by means of lever 22, the operator turns slide-valve 17 until it is stopped by an abutment, thus providing a connection for the oil cylinder 12 on the one hand, and a gasoline inlet 19 on the other hand with the mixing cylinder 2 above the mixing piston 4. The pressure urges piston 4 downwards against the strength of spring 9. When the shoulders corresponding to the required mixture come in abutment against part 13, the oil piston 11 is driven in turn against the strength of spring 16 and delivers the oil contained in oil cylinders 10 and 12 to the mixing cylinder, above piston 4. When the cylinder pin 7 comes in abutment against the lower end of port-hole 8, the operator rotates slide-valve 17 until it is stopped by an abutment, in the reverse direction; by so doing, he provides a connection between the mixing cylinder 2 and the delivery duct 20, he stops the passage between the gasoline inlet 19 on the one hand, the oil cylinder 12 on the other hand and the mixing cylinder 2, and he opens passage between the oil tank 21 and the oil cylinder 12.

Under the effect of spring 9, cylinder 4 moves upwards, driving the mixture in the delivery duct 20. Piston 11 also moves back upwards under the effect of spring 16 up to the abutment of part 13 against the upper end of the port-holes 14. The oil moves then again upwards inside cylinder 10.

What I claim is:

1. A mixing and distributing apparatus comprising inlet means for oil, a duct for gasoline under pressure and a delivery duct, a first vertical cylinder fed from the top with oil and gasoline through a valve of a distributing unit in which slides a first piston, biased upwards by a spring, said cylinder being connected to the delivery duct via the valve, a second vertical cylinder located inside the first cylinder, under the first piston, in which slides a second oil piston, the lower portion of said second cylinder being connected with the upper portion of the first cylinder and with the inlet means via said valve, a first position of said valve allowing the first cylinder to be fed with gasoline under pressure, wherein said gasoline under pressure urges the first piston downward against the biasing spring, said first piston through abutment means in the final portion of its stroke urging the second piston downward to supply a metered amount of oil to the first cylinder so as to mix with the pressurized gasoline, a second position of the valve terminating the supply of oil and gasoline, said mixture being then expelled by the first cylinder piston under the effect of the biasing spring through the valve to the delivery duct.

2. An apparatus according to claim 1, wherein said abutment means comprises shoulders formed inside the first piston, coacting with a peg-shaped member arranged transversely in the upper portion of the second piston.

3. An apparatus according to claim 2, wherein said shoulders are arranged inside the first piston along two circular helixes, each shoulder of one helix being in diametrically opposed relationship with the shoulder of the other helix and at the same level corresponding to a percentage of oil to be mixed with the gasoline.

4. An apparatus according to claim 2, wherein the second cylinder is rotatably mounted, its rotation permitting position of the peg-shaped member of the second piston in register with the shoulders corresponding to the selected oil percentage.

* * * * *